(12) United States Patent
Yu (10) Patent No.: US 10,511,817 B2
(45) Date of Patent: Dec. 17, 2019

(54) PROJECTION DEVICE, AND METHOD AND DEVICE FOR CONTROLLING THE SAME

(71) Applicant: BOE TECHNOLOGY GROUP CO., LTD., Beijing (CN)

(72) Inventor: Zhanquan Yu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/028,384

(22) Filed: Jul. 5, 2018

(65) Prior Publication Data

US 2019/0208171 A1 Jul. 4, 2019

(30) Foreign Application Priority Data

Jan. 2, 2018 (CN) .......................... 2018 1 0002390

(51) Int. Cl.
*H04N 9/31* (2006.01)
(52) U.S. Cl.
CPC ......... *H04N 9/3176* (2013.01); *H04N 9/3194* (2013.01)
(58) Field of Classification Search
CPC ........................... H04N 9/3176; H04N 9/3194
USPC ................. 348/744, 552, 794, 831; 312/10.1
See application file for complete search history.

(56) References Cited

U.S. PATENT DOCUMENTS

| 2014/0039674 A1* | 2/2014 | Motoyama ........... G03B 21/142 |
| | | 700/245 |
| 2017/0330495 A1* | 11/2017 | Doi ......................... G03B 21/14 |
| 2018/0221240 A1* | 8/2018 | Yu ........................... A61H 3/061 |

* cited by examiner

*Primary Examiner* — Jefferey F Harold
*Assistant Examiner* — Jean W Desir
(74) *Attorney, Agent, or Firm* — Kinney & Lange, P.A.

(57) ABSTRACT

A method for controlling a projection device is disclosed, including steps of: receiving a projection instruction, and extracting projection information contained in the projection instruction, the projection information including destination position information and target projection position information; moving the projection device to a destination position in accordance with the destination position information and a predetermined map; and adjusting a projection height and/or a projection angle in accordance with the target projection position information, so as to adjust a projection position of the projection device to a target projection position.

12 Claims, 7 Drawing Sheets

PROJECTION DEVICE, AND METHOD AND DEVICE FOR CONTROLLING THE SAME

CROSS-REFERENCE TO RELATED APPLICATION

The present application claims a priority of the Chinese patent application No. 201810002390.4 filed on Jan. 2, 2018, which is incorporated herein by reference in its entirety.

TECHNICAL FIELD

The present disclosure relates to the field of automatic control, positioning and projection technologies, in particular to a projection device, and a method and a device for controlling the projection device.

BACKGROUND

Projectors are often used in education activities or the like. Depending on different application scenarios, the projector is installed at different positions. In the case that an application scenario is changed, it is necessary to displace the projector (i.e., dismount the projector installed at one position and then install it at another position, so it is inconvenient to mount, dismount and use the projector), or purchase a new projector (resulting in an increase in the cost and the work load of installation).

SUMMARY

In one aspect, the present disclosure provides in some embodiments a method for controlling a projection device, including steps of: receiving a projection instruction, and extracting projection information contained in the projection instruction, the projection information including destination position information and target projection position information; moving the projection device to a destination position in accordance with the destination position information and a predetermined map; and adjusting a projection height and/or a projection angle in accordance with the target projection position information, so as to adjust a projection position of the projection device to a target projection position.

In a possible embodiment of the present disclosure, the method further includes creating the predetermined map.

In a possible embodiment of the present disclosure, the step of creating the predetermined map includes: moving the projection device in a target environment in a traverse manner, so as to acquire environmental information about the target environment; and creating the predetermined map in accordance with the environmental information about the target environment, and storing the predetermined map in a storage medium connected to the projection device.

In a possible embodiment of the present disclosure, the step of moving the projection device to the destination position in accordance with the destination position information and the predetermined map includes: configuring a movement path of the projection device in accordance with the destination position information and the predetermined map; and moving the projection device to the destination position corresponding to the destination position information in accordance with the movement path.

In a possible embodiment of the present disclosure, the step of moving the projection device to the destination position corresponding to the destination position information in accordance with the movement path includes: detecting whether or not there is an obstacle in front of, and at a predetermined distance from, the projection device in the case that the projection device moves forward along the movement path; and in the case that there is the obstacle, controlling the projection device to bypass the obstacle.

In a possible embodiment of the present disclosure, the step of moving the projection device in the target environment in a traverse manner so as to acquire the environmental information about the target environment includes: detecting whether or not there is an obstacle in front of, and at a predetermined distance from, the projection device in a current movement direction; and in the case that there is the obstacle, controlling the projection device to bypass the obstacle.

In another aspect, the present disclosure provides in some embodiments a device for controlling a projection device, including a processor and a memory storing therein a computer program. The processor is configured to execute the computer program, so as to: receive a projection instruction, and extract projection information contained in the projection instruction, the projection information including destination position information and target projection position information; move the projection device to a destination position in accordance with the destination position information and a predetermined map; and adjust a projection height and/or a projection angle in accordance with the target projection position information, so as to adjust a projection position of the projection device to a target projection position.

In a possible embodiment of the present disclosure, the processor is further configured to create the predetermined map.

In a possible embodiment of the present disclosure, the processor is further configured to: move the projection device in a target environment in a traverse manner, so as to acquire environmental information about the target environment; and create the predetermined map in accordance with the environmental information about the target environment, and store the predetermined map in a storage medium connected to the projection device.

In a possible embodiment of the present disclosure, the processor is further configured to: configure a movement path of the projection device in accordance with the destination position information and the predetermined map; and move the projection device to the destination position corresponding to the destination position information in accordance with the movement path.

In a possible embodiment of the present disclosure, the processor is further configured to: detect whether or not there is an obstacle in front of, and at a predetermined distance from, the projection device in the case that the projection device moves forward along the movement path; and in the case that there is the obstacle, control the projection device to bypass the obstacle.

In a possible embodiment of the present disclosure, the processor is further configured to: detect whether or not there is an obstacle in front of, and at a predetermined distance from, the projection device in a current movement direction; and in the case that there is the obstacle, control the projection device to bypass the obstacle.

In yet another aspect, the present disclosure provides in some embodiment a projection device, including a device for controlling the projection device, and a projection module, a movement member and a projection position adjustment mechanism electrically connected to the device for controlling the projection device. The device for controlling the projection device includes a processor and a memory storing therein a computer program. The processor is configured to execute the computer program, so as to: receive a projection instruction, and extract projection information contained in the projection instruction, the projection information including destination position information and target projection position information; move the projection device to a destination position in accordance with the destination position information and a predetermined map; and adjust a projection height and/or a projection angle in accordance with the target projection position information, so as to adjust a projection position of the projection device to a target projection position. The movement member is connected to the projection module through the projection position adjustment mechanism, so as to move the projection module to the destination position through the movement member and adjust the projection position of the projection module to the target projection position through the projection position adjustment mechanism.

In a possible embodiment of the present disclosure, the projection position adjustment mechanism is provided with an installation platform onto which an installation groove is sleeved. A positioning member and a power supply member are arranged at a bottom of the installation groove, and a plurality of elastic members is arranged at an inner wall of the installation groove. The projection module is provided with a positioning hole corresponding to the positioning member, a connection member electrically connected to the power supply member, and a boss corresponding to the installation groove. Slots corresponding to the elastic members are arranged at an outer wall of the boss.

In a possible embodiment of the present disclosure, the projection position adjustment mechanism includes a telescopic mechanism and an angle adjustment member including the installation platform. The projection module is removably sleeved onto the positioning member through the positioning hole, and the angle adjustment member is connected to the movement member through the telescopic mechanism. The angle adjustment member includes a magnetic member and an electromagnetic member arranged opposite to each other and cooperating with each other. The magnetic member is arranged at a side of the installation platform away from the installation groove, and the electromagnetic member is fixedly connected to the telescopic mechanism.

In a possible embodiment of the present disclosure, the electromagnetic member is provided with an electrically conductive sliding rail, the magnetic member is provided with a sliding member capable of sliding along the electrically conductive sliding rail, and angle feedback members are arranged on the electrically conductive sliding rail and the magnetic member respectively.

In a possible embodiment of the present disclosure, the movement member is provided at its bottom with a stabilization member electrically connected to the device for controlling the projection device. The stabilization member is a guide rod, and a stabilizer is arranged at a side of the guide rod away from the movement member.

In a possible embodiment of the present disclosure, the movement member is provided with a charging member, a laser radar and an infrared sensor which are electrically connected to the device for controlling the projection device. The projection module includes a camera and a projection light source arranged opposite to each other on an outer wall of the projection module.

In a possible embodiment of the present disclosure, the positioning member is a positioning pin of a non-circular cross section, and the projection module is provided at its bottom with the positioning hole corresponding to the positioning member.

In a possible embodiment of the present disclosure, the holes for the elastic members are formed in the inner wall of the installation groove, and each elastic member includes a spring and a ball.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure. An identical or similar reference numeral in the embodiments of the present disclosure represents an identical or similar element.

Unless otherwise defined, such words as "one" or "one of" are merely used to represent the existence of at least one member, rather than to limit the number thereof. Such words as "include" or "including" intend to indicate that there are the features, integers, steps, operations, elements and/or assemblies, without excluding the existence or addition of one or more other features, integers, steps, operations, elements, assemblies and/or combinations thereof. In the case that one element is connected or coupled to another element, it may be directly connected or coupled to the other element, or an intermediate element may be arranged therebetween. At this time, the element may be connected or coupled to the other element in a wireless or wired manner. In addition, the expression "and/or" is used to indicate the existence of all or any one of one or more of listed items, or combinations thereof.

Unless otherwise defined, any technical or scientific term used herein shall have the common meaning understood by a person of ordinary skills. Any term defined in a commonly-used dictionary shall be understood as having the meaning in conformity with that in the related art, shall not be interpreted idealistically and extremely.

Figure 1:
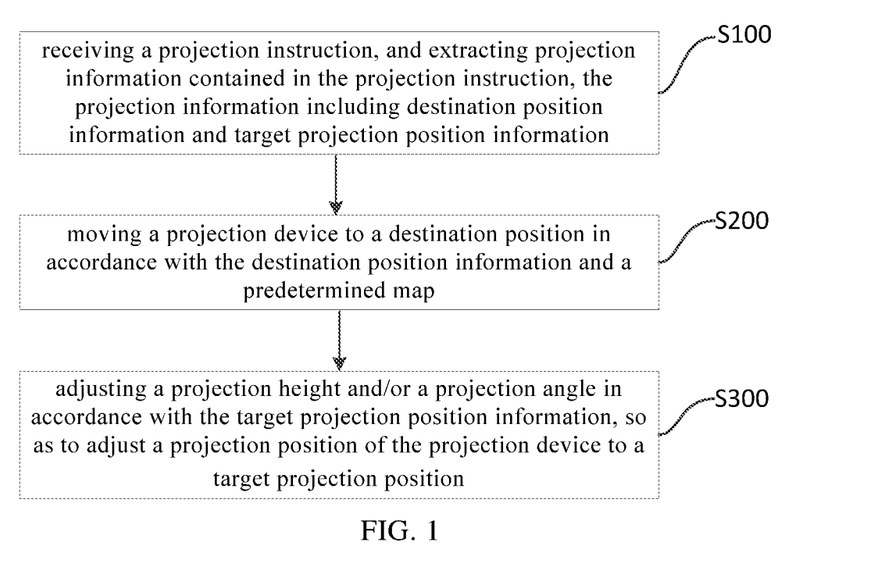
FIG. 1 is a flow chart of a method for controlling a projection device according to one embodiment of the present disclosure.

The present disclosure provides in some embodiments a method for controlling a projection device which, as shown in FIG. 1, includes: Step S100 of receiving a projection instruction, and extracting projection information contained in the projection instruction, the projection information including destination position information and target projection position information; Step S200 of moving the projection device to a destination position in accordance with the destination position information and a predetermined map; and Step S300 of adjusting a projection height and/or a projection angle in accordance with the target projection position information, so as to adjust a projection position of the projection device to a target projection position.

In the case that the projection device is to be used, the projection device is started, so as to receive the projection instruction from a user. The projection information contained in the projection instruction includes the destination position information about the destination position to which the projection device is to be moved, and the target projection position information. Upon the receipt of the projection instruction, it is necessary to extract the projection information contained in the projection instruction. The target projection position information mainly includes a height and a horizontal rotation angle of the projection device. The projection device is provided with a camera and a voice recognition member. A face image of the user is stored in the projection device in advance, and the projection device may be started in the case that the user faces the camera. In addition, the projection instruction may be inputted into the projection device through the voice recognition member and the camera, so as to enable the projection device to perform operations associated with the projection instruction, e.g., enable the projection device to move or adjust its height and/or angle. Also, the projection instruction may be inputted to the projection device via a terminal (e.g., a computer, a PAD or a mobile phone) connected to the projection device, or directly inputted on the projection device. Of course, the projection instruction may be inputted in any other appropriate ways, but not limited to those mentioned above. Next, it is necessary to determine whether or not there is the predetermined map containing the destination position information, i.e., determine whether or not a target environment where an image is to be projected by the projection device contains the destination position. In the case that there is the predetermined map, it means there is the target environment. At this time, the projection device may be moved to a position corresponding to the destination position information. For example, the destination position information may be "two meters in front of a projection screen in conference room #1". Of course, the destination position information may also be a specific coordinate value. In addition, the target projection position information may be a height and a rotation angle of the projection device, so as to project the image exactly onto a projection screen.

In the case that the predetermined map contains the destination position information, it means the predetermined map corresponds to the target environment where the projection device is located. At this time, the projection device may be moved to a position corresponding to the predetermined target position in accordance with the destination position information and the predetermined map. For example, in the case that the destination position information is "two meters in front of a projection screen in conference room #1" which is contained in the predetermined map, the projection device may be moved to a position corresponding to "two meters in front of a projection screen in conference room #1". The projection device includes a telescopic mechanism and an angle adjustment member. In the case that the projection device has been moved to the position corresponding to the destination position information, the position of the projection device may be adjusted through the telescopic mechanism and/or the angle adjustment member, so as to enable the projection device to be located at a position corresponding to the target projection position information. For example, in the case that the projection device is located at an appropriate angle but at a level insufficient to display the entire image on the projection screen, the projection device may be moved upward through the telescopic mechanism until it is located at an appropriate level and the entire image is capable of being displayed on the projection screen. For another example, in the case that the projection device is located at an appropriate level but the image displayed on the projection screen is offset by 90° in a clockwise direction relative to a normal state, the projection angle of the projection device may be adjusted through the angle adjustment member, so as to rotate the projection device by 90° in a horizontal direction in a counterclockwise direction, thereby to display the image on the projection screen correctly. For yet another example, in the case that the projection device is located at an insufficient level and the image displayed on the projection screen is offset by 90° in the clockwise direction relative to the normal state, the height and the projection angle of the projection device may be adjusted through the telescopic mechanism and the angle adjustment member respectively, i.e., to move the projection device upward and rotate the projection device in the horizontal direction by 90° in the counterclockwise direction, so as to completely and correctly display the image on the projection screen.

Figure 2:
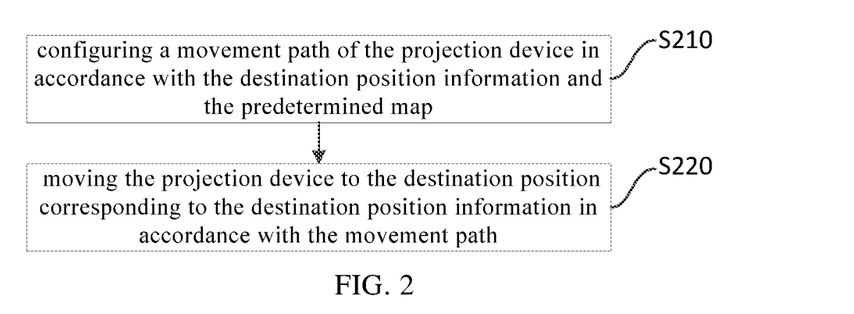
FIG. 2 is another flow chart of the method for controlling the projection device according to one embodiment of the present disclosure.

In a possible embodiment of the present disclosure, as shown in FIG. 2, Step S200 of moving the projection device to the destination position in accordance with the destination position information and the predetermined map includes: Step S210 of configuring a movement path of the projection device in accordance with the destination position information and the predetermined map; and Step S220 of moving the projection device to the destination position corresponding to the destination position information in accordance with the movement path.

In order to move the projection device directly and rapidly to the position corresponding to the destination position information, the movement path to the destination position may be planned out in accordance with the predetermined map. This movement path may be short and straight with few obstacles, or relatively short with few obstacles, so as to move the projection device rapidly to the destination position. In other words, in the case of planning out the movement path, it is necessary to simultaneously meet such conditions as being short, being straight and few obstacles as possible. Then, the projection device may be moved to the destination position in accordance with the movement path. For example, in the case that the projection device is initially located at a position behind a door to certain room and the destination position information is "two meters in front of a projection screen in conference room #1", the projection device may be moved from the position behind the door to a position corresponding to "two meters in front of a projection screen in conference room #1" in accordance with the planned movement path.

Further, the step of creating the predetermined map includes: moving the projection device in a target environment in a traverse manner, so as to acquire environmental information about the target environment; and creating the predetermined map in accordance with the environmental information about the target environment, and storing the predetermined map in a storage medium connected to the projection device.

The above description relates to the state where there is the predetermined map of the target environment. In the case that the predetermined map is not stored in the projection device or the terminal connected to the projection device, it is necessary for the projection device to move in the target environment in a traverse manner, so as to acquire the environmental information about the target environment. The environmental information mainly includes objects at different positions as well as shapes and sizes of the objects. In the case that there is no map corresponding to the target environment, it means that the target environment is an unknown environment. At this time, the projection device may be moved in the target environment in a traverse manner. During the movement, the target environment may be scanned by a laser radar of the projection device. To be specific, a laser beam generator of the laser radar may generate a laser beam toward an object, and then a receiver of the laser radar may receive the laser beam reflected by the object, so as to acquire the map of the target environment. A propagation time of the laser beam may be accurately measured by the receiver. In addition, due to the speed of the laser beam, the receiver may always receive the laser beam reflected by the object prior to the generation of a next laser beam. The speed of the laser beam is already known, so it is able to measure a distance between the projection device and the object in accordance with the propagation time. Based on a current position of the laser radar, a height of the laser radar, a scanning angle of the laser beam and a direction of the laser beam, it is able to accurately calculate coordinate values X, Y and Z of each light spot. The laser beams may be generated at a frequency of several or tens of thousands of pulses per second.

After the creation, the predetermined map may be stored in any one or more of the terminal, the projection device and a cloud. At this time, it is able to call the predetermined map, thereby to determine the destination position information and plan out the movement path in accordance with the predetermined map.

Further, the step of moving the projection device to the destination position corresponding to the destination position information in accordance with the movement path includes: detecting whether or not there is an obstacle in front of, and at a predetermined distance from, the projection device in the case that the projection device moves forward along the movement path; and in the case that there is the obstacle, controlling the projection device to bypass the obstacle.

Further, the step of moving the projection device in the target environment in a traverse manner so as to acquire the environmental information about the target environment includes: detecting whether or not there is an obstacle in front of, and at a predetermined distance from, the projection device in a current movement direction; and in the case that there is the obstacle, controlling the projection device to bypass the obstacle.

In the case that the projection device moves in the target environment in a traverse manner or moves to the destination position, it may collide with the obstacle. The predetermined distance is stored in the projection device, and an obstacle-avoiding member is used to detect whether or not there is the obstacle. In the case that there is the obstacle in front of, and at the predetermined distance from, the projection device in the current movement direction, it means that the movement of the projection device may be stopped due to the obstacle. At this time, it is necessary to control the projection device to bypass the obstacle, thereby to facilitate the acquisition of the environmental information or the movement of the projection device to the target position. In a possible embodiment of the present disclosure, the projection device is provided with an obstacle-avoiding sensor (e.g., an ultrasonic sensor, a visual sensor, an infrared sensor or a laser sensor), so as to detect whether or not there is the obstacle in front of, and at the predetermined distance from, the projection device in the current movement direction. In the case that there is the obstacle, the projection device may be controlled to bypass the obstacle. In this way, it is able to prevent the movement of the projection device from being adversely affected by the obstacle in front of the projection device.

Figure 3:
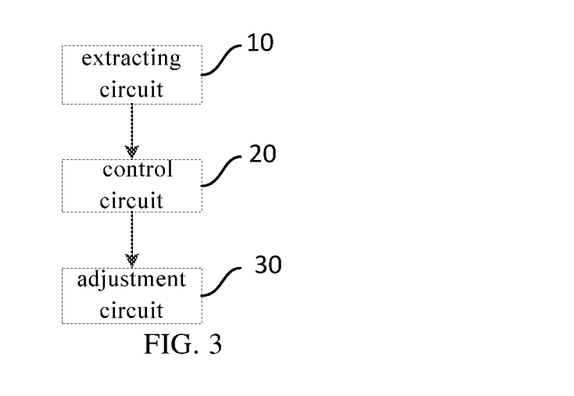
FIG. 3 is a schematic view showing a device for controlling a projection device according to one embodiment of the present disclosure.

The present disclosure further provides in some embodiments a device for controlling a projection device which, as shown in FIG. 3, includes a extracting circuit 10, a control circuit 20 and an adjustment circuit 30. The extracting circuit 10 is configured to receive a projection instruction and extract projection information contained in the projection instruction, and the projection information includes destination position information and target projection position information. The control circuit 20 is configured to move the projection device to a destination position in accordance with the destination position information and a predetermined map. The adjustment circuit 30 is configured to adjust a projection height and/or a projection angle in accordance with the target projection position information, so as to adjust a projection position of the projection device to a target projection position.

The present disclosure further provides in some embodiments a device for controlling a projection device, which includes a processor and a memory storing therein a computer program. The processor is configured to execute the computer program, so as to implement the above-mentioned method.

Figure 4:
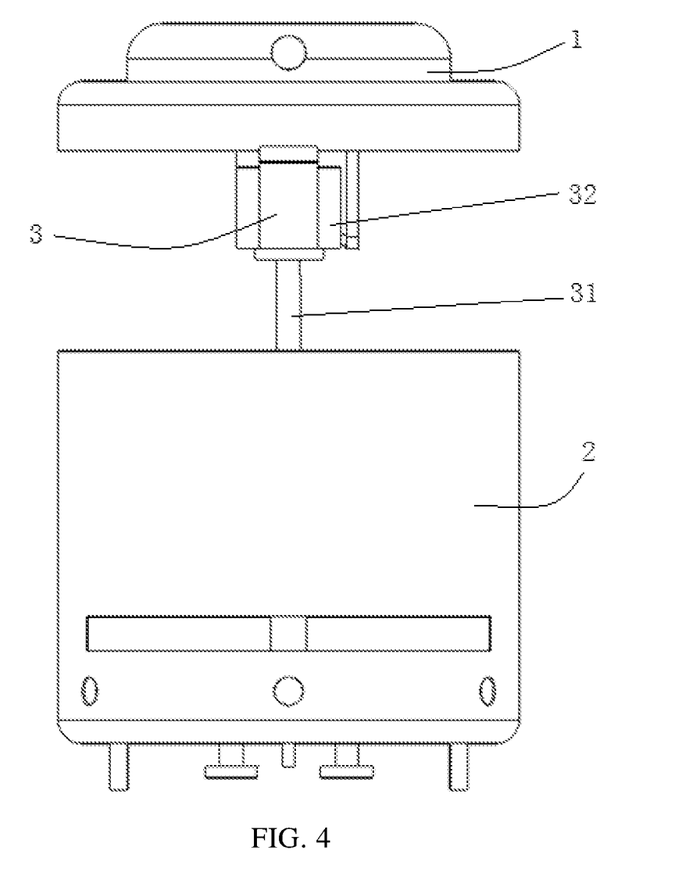
FIG. 4 is a schematic view showing a projection device according to one embodiment of the present disclosure.

The present disclosure further provides in some embodiments a projection device which, as shown in FIG. 4, includes a device for controlling the projection device, and a projection module 1, a movement member 2 and a projection position adjustment mechanism 3 electrically connected to the device for controlling the projection device. The movement member 2 is connected to the projection module 1 through the projection position adjustment mechanism 3, so as to move the projection module 1 to the destination position through the movement member 2 and adjust the projection position of the projection module 1 to the target projection position through the projection position adjustment mechanism 3. The movement member 2 and the projection module 1 are arranged at two opposite ends of the projection position adjustment mechanism 3. The movement member 2 and the projection position adjustment mechanism 3 are electrically connected to, and controlled by, the device for controlling the projection device, so as to enable the projection position of the projection module 1 to correspond to the destination position information and the target projection position information. The projection position adjustment mechanism 3 includes a telescopic mechanism 31 and an angle adjustment member 32.

The projection module 1 is mainly provided with a projection light source. In addition, in order to start the projection module 1 through face recognition, the projection module 1 is provided with a camera at a side opposite to the projection light source. The camera is further configured to provide a video call function, and project a video image through the projection light source during the video call. A plurality of wheels is arranged evenly at a bottom of the movement member 2. In a possible embodiment of the present disclosure, a plurality of wheels may also be arranged symmetrically at two sides of the bottom of the movement member 2, and the wheels at a same side are provided with a track, so as to enable the projection device to move along an uneven surface. In another possible embodiment of the present disclosure, a walking mechanism may be arranged at the bottom of the movement member 2, so as to walk like legs. The walking mechanism includes at least one leg, and the projection device moves like walking with legs through the movement member 2.

As shown in FIG. 4, the projection position adjustment mechanism 3 includes the telescopic mechanism 31 and the angle adjustment member 32. To be specific, the telescopic mechanism 31 and the angle adjustment member 32 are electrically connected to, and controlled by, the device for controlling the projection device, so as to adjust the height and the rotation angle of the projection module 1. In a possible embodiment of the present disclosure, the telescopic mechanism 31 may be any one of a power-driven push rod, multi-stage telescopic push rods sleeved one onto another, and multi-stage push rods (where two adjacent push rods are flexibly connected to each other). Under the control of the device for controlling the projection device, a height of the projection module in a vertical direction may be changed through the telescopic structure 31, so as to enable the height of the projection module to correspond to the target projection position information. Illustratively but non-restrictively, the angle adjustment member 32 may include an electromagnetic member, so as to drive the projection module 1 to rotate along with the movement member 2, thereby to change the projection angle of the projection module 1. The angle adjustment member 32 is principally configured to adjust a horizontal rotation angle of the projection module 1. Of course, the angle adjustment member 32 may also be configured to adjust the rotation angle of the projection module 1 in any other directions.

Figure 5:
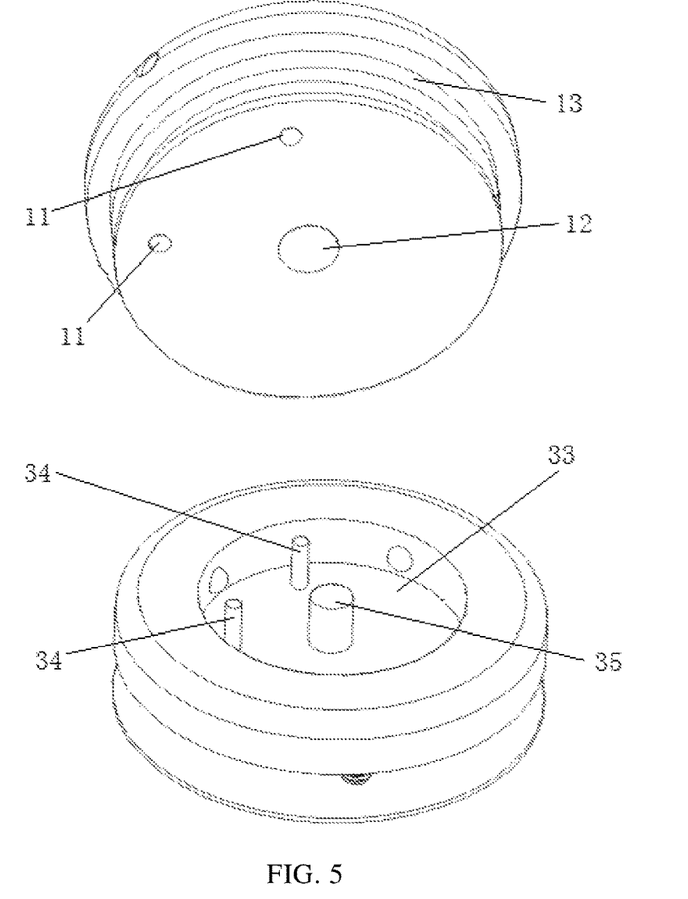
FIG. 5 is a schematic view showing a projection module and a projection position adjustment mechanism in FIG. 4 (principally showing a positioning member and a power supply member of the projection position adjustment mechanism as well as a positioning hole of the projection module corresponding to the positioning member and a connection member of the projection module corresponding to the power supply member)
Figure 6:
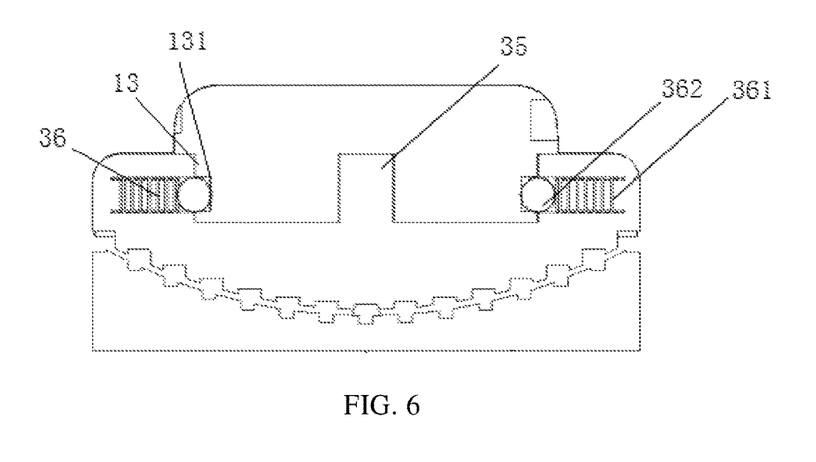
FIG. 6 is a schematic view showing the projection module and the projection position adjustment mechanism in FIG. 4 (principally showing a spring and a ball of each elastic member of the projection position adjustment mechanism)

As shown in FIG. 5 and FIG. 6, the projection position adjustment mechanism 3 is provided with an installation platform onto which an installation groove 33 is sleeved. A positioning member 34 and a power supply member 35 are arranged at a bottom of the installation groove 33, and a plurality of elastic members 36 is arranged at an inner wall of the installation groove 34. The projection module 1 is provided with a positioning hole 11 corresponding to the positioning member 34, a connection member 12 electrically connected to the power supply member 12, and a boss 13 corresponding to the installation groove 33. Slots 131 corresponding to the elastic members 36 are arranged at an outer wall of the boss 13. For example, the positioning member 34 is a cylindrical positioning pin, or a positioning pin of a non-circular cross section, and the projection module 1 is provided at its bottom with the positioning hole 11 corresponding to the positioning member 34. In the case that the positioning pin is of a cylindrical shape, the position hole 11 may also be of a cylindrical shape and have a size matching the positioning pin. In the case that the positioning pin is of a non-circular cross section, a shape and a size of the positioning hole 11 may match those of the positioning pin respectively. In this way, it is able to prevent the projection device from shaking during the rotation, and facilitate the dismounting of the projection module 1 for any other application scenario.

Further, in order to facilitate the mounting and dismounting of the projection module, the plurality of elastic member 36 is arranged at the inner wall of the installation groove 33. The installation groove 33 is provided in its inner wall with a plurality of holes for receiving the elastic members 36. Each elastic member 36 includes a spring 361 and a ball 362. One end of the spring 361 is connected to a bottom of the corresponding hole, and the other end is in contact with the ball 362. The ball 362 is arranged at an opening of the hole, with a half of the ball 362 being located within the hole and the other half being located outside the hole. Here, a ratio of a portion of the ball 362 located within the hole to a portion of the ball 362 located outside the hole may be set reasonably in accordance with the practical need. In the case that the projection module 1 is pushed into the installation groove 33, due to a force applied by the projection module 1 toward the ball 362, the ball 362 may press against the spring 361, so it is able to mount the projection module 1 into the groove 33.

The projection module 1 is further provided with the boss 13 corresponding to the installation groove 33, and the slots 131 corresponding to the elastic members 36 are formed in the outer wall of the boss 13. In the case that the projection module 1 is pushed into the installation groove 33, due to a counter force generated by the spring 361, a portion of the ball 362 may be located within the corresponding slot 131. The power supply member 35 is arranged at the bottom of the installation groove 33, so as to enable the projection module 1 to achieve the projection, photographing, video call and face recognition functions normally. The projection module 1 is further provided with the connection member 12 electrically connected to the power supply member 35. Illustratively but non-restrictively, the power supply member 35 is of a cylindrical shape, and the connection member 12 is provided with a hole. Hence, it is able to fix the projection module 1 in a better manner in the case that the projection module 1 is powered by the power supply member 35.

As shown in FIG. 4, the projection position adjustment mechanism 3 includes the telescopic mechanism 31 and the angle adjustment member 32, and the angle adjustment member 32 is provided with the installation platform. The installation groove is arranged at a top of the angle adjustment member 32, and the projection module 1 is removably sleeved onto the positioning member through the positioning hole. The angle adjustment member 32 is connected to the movement member 2 through the telescopic mechanism 31. The angle adjustment member 32 includes a magnetic member and an electromagnetic member arranged opposite to each other and cooperating with each other. The magnetic member is arranged at a side of the installation platform away from the installation groove, and the electromagnetic member is fixedly connected to the telescopic mechanism 31.

One end of the telescopic mechanism 31 is connected to the movement member 2 and capable of moving in a direction away from the movement member 2. The angle adjustment member 32 is arranged at the other end of the telescopic mechanism 31. Illustratively but non-restrictively, the magnetic member is of an arc shape, and the electromagnetic member has a concave surface. The magnetic member is arranged at a side of the angle adjustment member away from the installation groove and protrudes toward the installation groove. In this way, in the case that the electromagnetic member is energized to generate a magnetism opposite to the magnetic member and the movement member 2 drives the electromagnetic member to rotate, the magnetic member may rotate synchronously.

Figure 7:
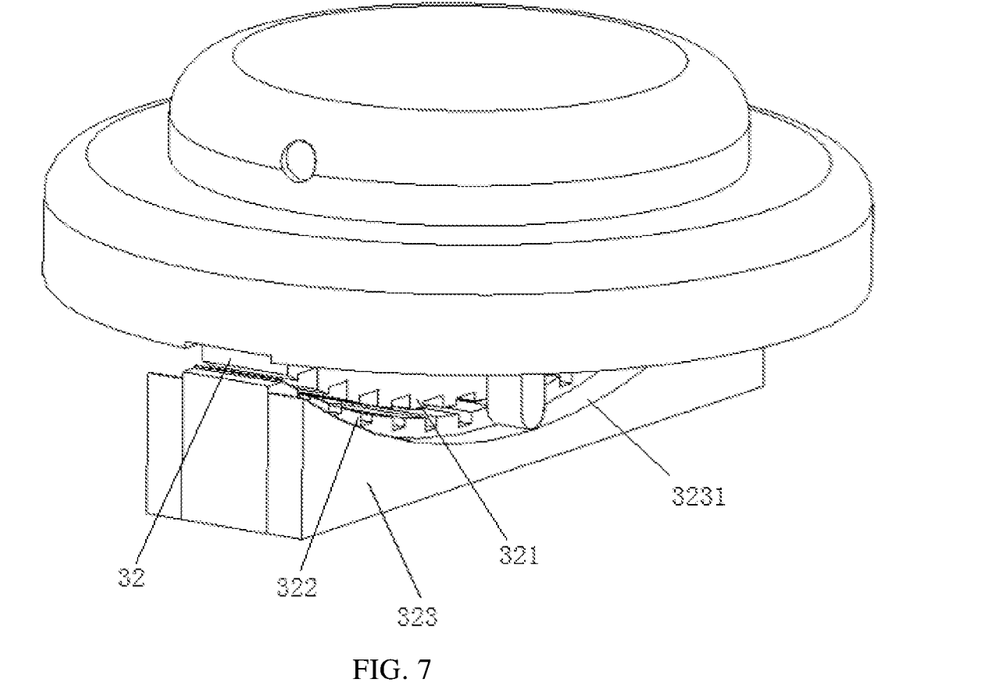
FIG. 7 is a schematic view showing an angle adjustment member of the projection position adjustment mechanism in FIG. 4 (principally showing a magnetic member and an electromagnetic member of the angle adjustment member)

One end of the telescopic mechanism 31 is located inside the movement member 2 and fixedly connected to the movement member 2, and the other end thereof is connected to the angle adjustment member 32. To be specific, the other end of the telescopic mechanism 31 is fixedly connected to the electromagnetic member. During the projection, it is necessary to adjust the projection angle of the projection device accurately and stably within a large range. As shown in FIG. 7, the angle adjustment device 32 includes the arc-shaped magnetic member 321 and the electromagnetic member 322 having a concave surface corresponding to an arc surface of the magnetic member 321. Illustratively but non-restrictively, the magnetic member 321 includes several permanent magnets arranged evenly on the arc surface of the magnetic member. The electromagnetic member 322 includes several electromagnetic coils arranged evenly on the concave surface of the electromagnetic member. The magnetic member 321 is located at a side of the angle adjustment member 32 away from the installation groove and protrudes in a direction away from the installation groove. A small clearance is provided between the magnetic member 321 and the electromagnetic member 322. In the case that the electromagnetic coil is energized, a resultant magnetism of the electromagnetic member may be opposite to that of the magnetic member. Due to the principle that the opposite magnetic poles attract, in the case that the movement member 2 drives the electromagnetic member to rotate, the magnetic member may rotate synchronously with the movement member 2 too. Obviously, as compared with a conventional angle adjustment mode, in the embodiments of the present disclosure, it is able to adjust the projection angle of the projection module accurately within a large range.

Figure 8:
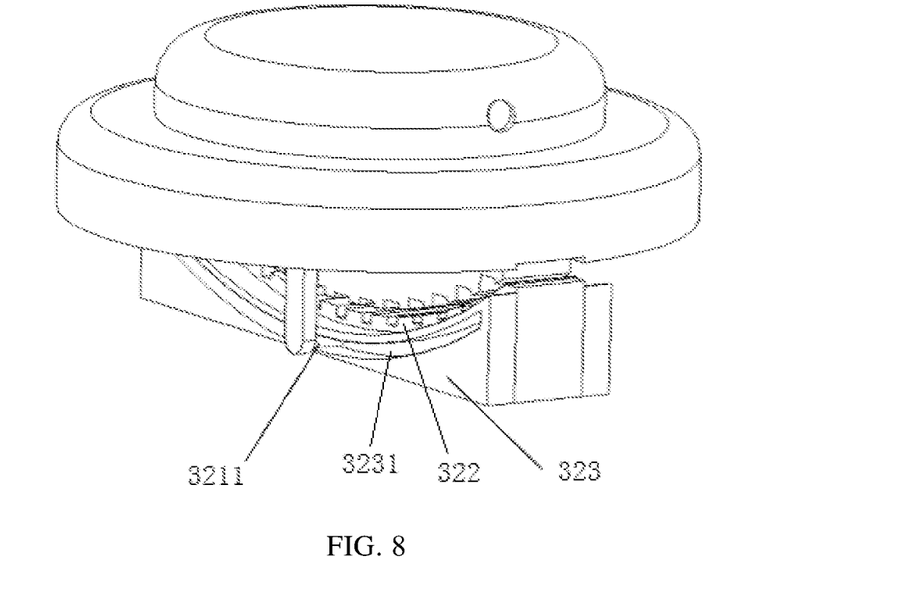
FIG. 8 is a schematic view showing the angle adjustment member of the projection position adjustment mechanism in FIG. 4 (principally showing a sliding member and an electrically conductive sliding rail)

In a possible embodiment of the present disclosure, as shown in FIG. 7 and FIG. 8, the electromagnetic member 322 is provided with an electrically conductive sliding rail 3231, and the magnetic member 321 is provided with a sliding member 3211 capable of sliding along the electrically conductive sliding rail 3231. Each of the electrically conductive guiding rail 3231 and the magnetic member 321 is provided with an angle feedback member 32. In a possible embodiment of the present disclosure, an electrically conductive sliding ring 323 is arranged at a side of the electromagnetic member 322 away from the magnetic member. Illustratively but non-restrictively, the electrically conductive sliding rail 3231 is formed on an arc portion of the electrically conductive sliding ring. The electrically conductive sliding rail 322 and a center corresponding to the arc surface of the electromagnetic member 322 are located at a same side of the electromagnetic member 322. Through the sliding member 3211 and the electrically conductive sliding rail 3231, the permanent magnets and the electromagnetic coils may move along the arc surface, so as to adjust the projection angle stably. The sliding member 3211 is of a cylindrical shape, and it is fixedly mounted on the projection position adjustment mechanism 3 through a connection member. For example, one end of the connection member is connected to the sliding member, and the other end is connected to the magnetic member 321.

In a possible embodiment of the present disclosure, the angle adjustment member 32 includes the angle feedback members (not shown) arranged on the magnetic member 321 and the electromagnetic member 322 respectively, especially on the electrically conductive sliding rail and the magnetic member respectively. Illustratively but non-restrictively, each angle feedback member may be a grating ruler. Through the angle feedback members, it is able to adjust the rotation angle of the projection device accurately.

Figure 9:
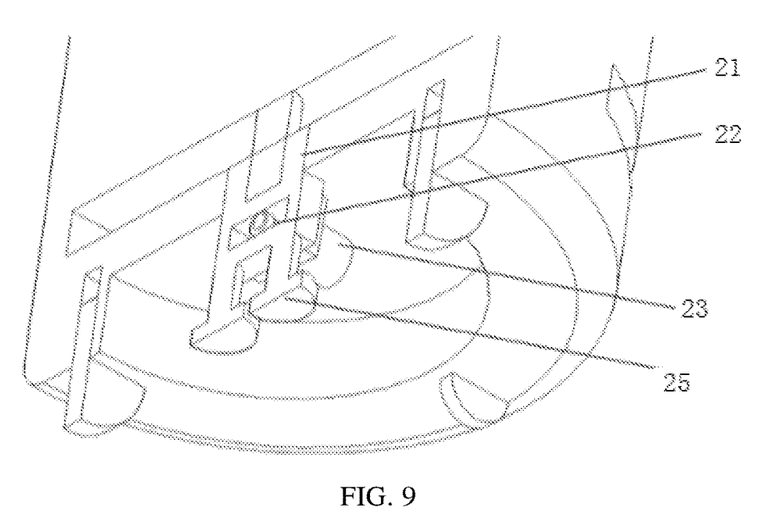
FIG. 9 is a schematic view showing a movement member in FIG. 4 (principally showing a stabilization member of the movement member)

In a possible embodiment of the present disclosure, as shown in FIG. 9, the movement member 2 is provided at its bottom with a stabilization member which is electrically or mechanically controlled to move up and down. The stabilization member is provided with a guide rod 21, and a stabilizer 25 is arranged at a side of the guide rod 21 away from the movement member 2. The stabilization member is electrically connected to, and controlled by, the device for controlling the projection device. The guide rod is connected to an electric motor 23 through an eccentric wheel 22. During the projection, the electric motor 23 drives the eccentric wheel 22 to rotate, thereby to move the guide rod 21 to move up and down. Through the guide rod 21, the stabilizer 25 may fall onto the ground, so as to enable the projection device to project the image stably. In a possible embodiment of the present disclosure, the stabilizer 25 may be a pad.

Figure 10:
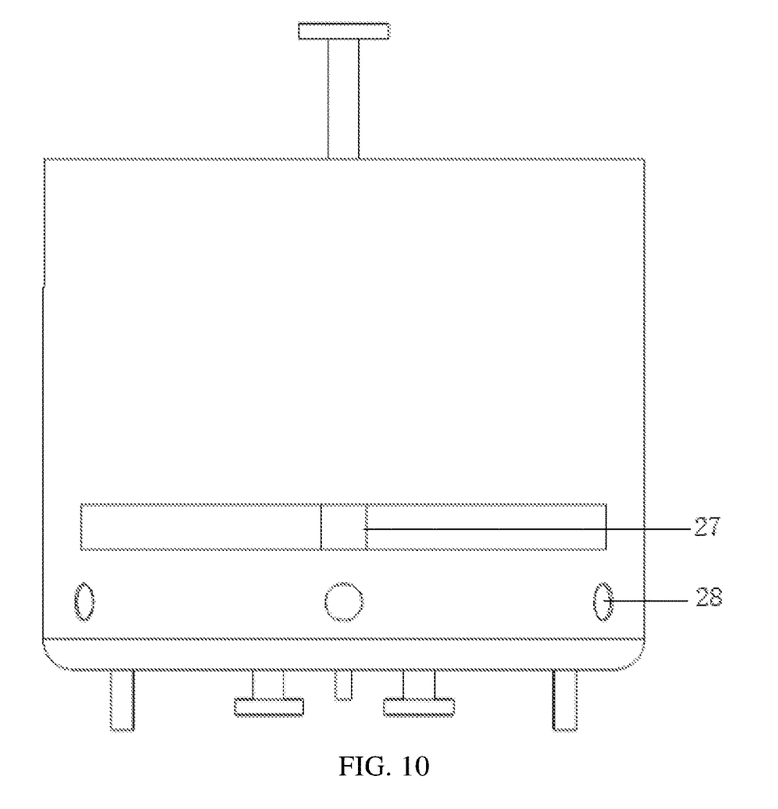
FIG. 10 is a schematic view showing a laser radar and an infrared sensor of the movement member in FIG. 4.
Figure 11:
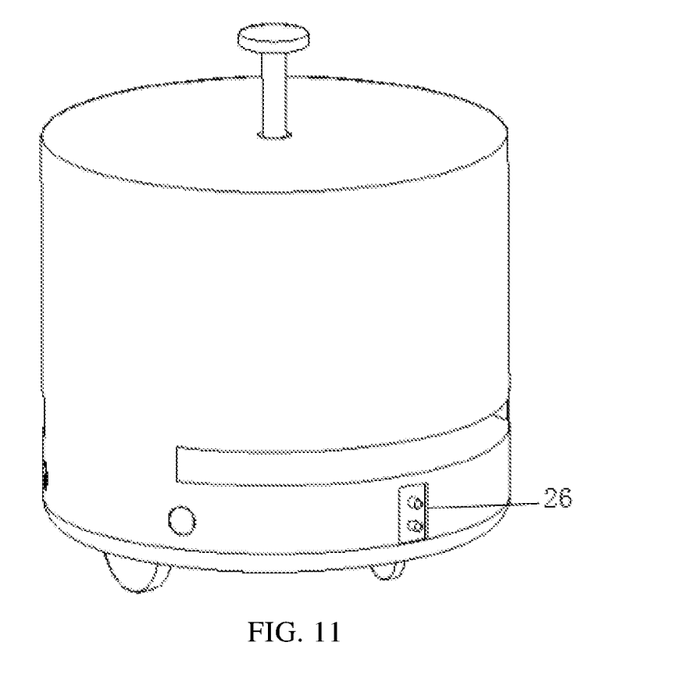
FIG. 11 is a schematic view showing a charging member of the movement member in FIG. 4.

In a possible embodiment of the present disclosure, as shown in FIG. 10 and FIG. 11, the movement member 2 is provided at an end adjacent to the ground with a charging member 26, a laser radar 27 and an infrared sensor 28. To be specific, the charging member 26 is configured to charge the projection device. The laser radar 27 is configured to acquire the environmental information so as to create the predetermined map of the target environment. The infrared sensor 28 is configured to detect whether or there is the obstacle during the movement of the projection device. The charging member 26, the laser radar 27 and the infrared sensor 28 are electrically connected to, and controlled by, the device for controlling the projection device.

Figure 12:
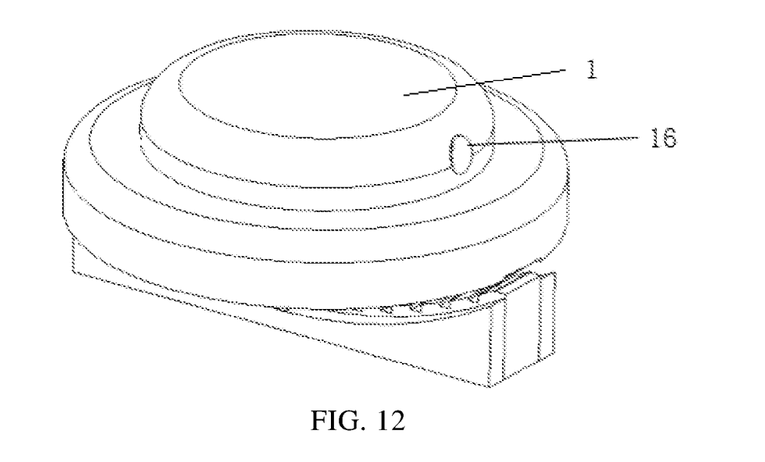
FIG. 12 is a schematic view showing a camera of the projection device in FIG. 4.
Figure 13:
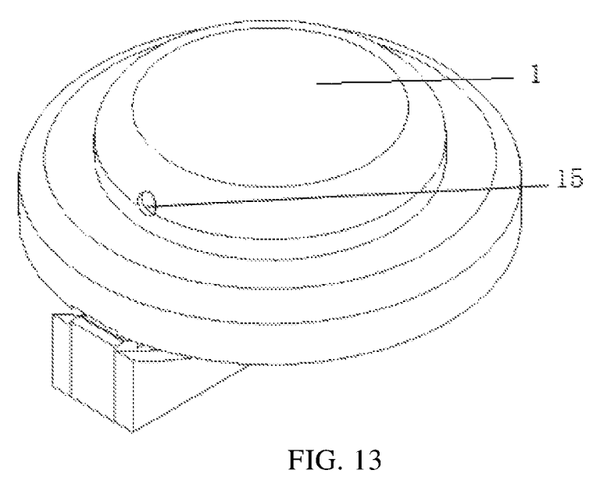
FIG. 13 is a schematic view showing a projection light source of the projection device in FIG. 4.

In a possible embodiment of the present disclosure, as shown in FIG. 12 and FIG. 13, the projection module 1 includes the camera 15 and the projection light source 16 arranged opposite to each other on an outer wall of the projection module 1.

The present disclosure at least has the one of the following beneficial effects.

Firstly, based on the predetermined map of the target environment, it is able to automatically move the projection device to the corresponding projection position as well as automatically adjust the height and the rotation angle of the projection module merely by manually inputting the destination position in the target environment and a projection requirement, thereby to accurately project the image onto the projection screen.

Secondly, in the case that there is no predetermined map of the target environment, the projection device may move in the target environment in a traverse manner, so as to create the map of the target environment. Next, the destination position may be inputted into the projection device, so as to move the projection device to the destination position.

Thirdly, during the movement of the projection in the target environment, it is able to detect, by the obstacle-avoiding sensor, whether or not there is the obstacle in front of the projection device. In the case that there is the obstacle, it is able for the projection device to bypass the obstacle automatically.

Fourthly, the projection device is provided with the control device, the movement member, the projection module and the projection position adjustment mechanism connecting the movement member and the projection module. The projection module is removably connected to the projection position adjust mechanism, so it is able to rapidly remove the projection module from the projection position adjustment mechanism or mount the projection module on the projection position adjustment mechanism.

Fifthly, the projection position adjustment mechanism is provided with the telescopic mechanism so as to adjust the height of the projection module. In addition, the projection position adjustment mechanism is further provided with the angle adjustment member capable of being electromagnetically controlled, so as to, during the rotation of the movement member, control the projection module to rotate along with the movement member, thereby to adjust the projection angle of the projection module. In a word, through the projection position adjust mechanism, it is able to change the position of the projection module, thereby to enable the projection module to project the image onto the projection screen accurately.

Sixthly, the stabilization member is arranged at the bottom of the movement member, the stabilization member is the guide rod, and the stabilizer with a relatively large friction coefficient is arranged at the side of the guide rod away from the movement member. In the case that the projection device is to be used, the stabilizer is closely attached onto the ground, so as to enable the projection module to project the image stably.

Seventhly, the projection device is provided with the charging member. In the case that the projection device has run out of battery, it may automatically search for a charging interface in accordance with the predetermined map of the target environment. At this time, the charging member may be automatically connected to the charging interface, so as to charge the projection device automatically.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A projection device, comprising a device for controlling the projection device, a projection module, a movement member, and a projection position adjustment mechanism, wherein the projection module, the movement member, and the projection position adjustment mechanism are electrically connected to the device for controlling the projection device, wherein the device for controlling the projection device comprises a processor and a memory storing therein a computer program, the processor is configured to execute the computer program, so as to: receive a projection instruction, and extract projection information contained in the projection instruction, the projection information comprising destination position information and target projection position information; move the projection device to a destination position in accordance with the destination position information and a predetermined map; and adjust a projection height and/or a projection angle in accordance with the target projection position information, so as to adjust a projection position of the projection device to a target projection position, and the movement member is connected to the projection module through the projection position adjustment mechanism, so as to move the projection module to the destination position through the movement member and adjust the projection position of the projection module to the target projection position through the projection position adjustment mechanism, wherein the projection position adjustment mechanism is provided with an installation platform onto which an installation groove is sleeved;

a positioning member and a power supply member are arranged at a bottom of the installation groove, and a plurality of elastic members is arranged at an inner wall of the installation groove;

the projection module is provided with a positioning hole corresponding to the positioning member, a connection member electrically connected to the power supply member, and a boss corresponding to the installation groove; and slots corresponding to the elastic members are arranged at an outer wall of the boss.

2. The projection device according to claim 1, wherein the projection position adjustment mechanism comprises a telescopic mechanism and an angle adjustment member comprising the installation platform;

the projection module is removably sleeved onto the positioning member through the positioning hole, and the angle adjustment member is connected to the movement member through the telescopic mechanism;

the angle adjustment member includes a magnetic member and an electromagnetic member arranged opposite to each other and cooperating with each other; and the magnetic member is arranged at a side of the installation platform away from the installation groove, and the electromagnetic member is fixedly connected to the telescopic mechanism.

3. The projection device according to claim 2, wherein the electromagnetic member is provided with an electrically conductive sliding rail, the magnetic member is provided with a sliding member capable of sliding along the electrically conductive sliding rail, and angle feedback members are arranged on the electrically conductive sliding rail and the magnetic member respectively.

4. The projection device according to claim 1, wherein the movement member is provided at its bottom with a stabilization member electrically connected to the device for controlling the projection device, the stabilization member is a guide rod, and a stabilizer is arranged at a side of the guide rod away from the movement member.

5. The projection device according to claim 1, wherein the movement member is provided with a charging member, a laser radar and an infrared sensor which are electrically connected to the device for controlling the projection device, and the projection module comprises a camera and a projection light source arranged opposite to each other on an outer wall of the projection module.

6. The projection device according to claim 1, wherein the positioning member is a positioning pin of a non-circular cross section, and the projection module is provided at its bottom with the positioning hole corresponding to the positioning member.

7. The projection device according to claim 1, wherein holes for the elastic members are formed in the inner wall of the installation groove, and each elastic member comprises a spring and a ball.

8. The projection device according to claim 1, wherein the processor is further configured to create the predetermined map.

9. The projection device according to claim 8, wherein the processor is further configured to:
move the projection device in a target environment in a traverse manner, so as to acquire environmental information about the target environment; and
create the predetermined map in accordance with the environmental information about the target environment, and store the predetermined map in a storage medium connected to the projection device.

10. The projection device according to claim 1, wherein the processor is further configured to:
configure a movement path of the projection device in accordance with the destination position information and the predetermined map; and
move the projection device to the destination position corresponding to the destination position information in accordance with the movement path.

11. The projection device according to claim 10, wherein the processor is further configured to:
detect whether or not there is an obstacle in front of, and at a predetermined distance from, the projection device in the case that the projection device moves forward along the movement path; and
in the case that there is the obstacle, control the projection device to bypass the obstacle.

12. The projection device according to claim 9, wherein the processor is further configured to:
detect whether or not there is an obstacle in front of, and at a predetermined distance from, the projection device in a current movement direction; and
in the case that there is the obstacle, control the projection device to bypass the obstacle.

* * * * *